US010481593B2

(12) United States Patent
Nausley et al.

(10) Patent No.: US 10,481,593 B2
(45) Date of Patent: *Nov. 19, 2019

(54) METHOD AND SYSTEM FOR CAPTURING AUTOMATION DATA

(71) Applicant: BEET, LLC, Plymouth, MI (US)

(72) Inventors: Ivan Richard Nausley, Dearborn, MI (US); Jeremy Philip Epple, Macomb, MI (US); Kusmady Susanto, Novi, MI (US); David Jingqiu Wang, Northville, MI (US)

(73) Assignee: BEET, LLC, Plymouth, MI (US)

( * ) Notice: Subject to any disclaimer, the term of this patent is extended or adjusted under 35 U.S.C. 154(b) by 136 days.

This patent is subject to a terminal disclaimer.

(21) Appl. No.: 15/689,052

(22) Filed: Aug. 29, 2017

(65) Prior Publication Data

US 2017/0357252 A1  Dec. 14, 2017

Related U.S. Application Data

(63) Continuation of application No. 13/693,758, filed on Dec. 4, 2012, now Pat. No. 9,778,652.

(Continued)

(51) Int. Cl.
G05B 23/02 (2006.01)

(52) U.S. Cl.
CPC ......... G05B 23/02 (2013.01); G05B 23/0221 (2013.01); G05B 23/0264 (2013.01)

(58) Field of Classification Search
CPC . G05B 23/02; G05B 23/0221; G05B 23/0264
See application file for complete search history.

(56) References Cited

U.S. PATENT DOCUMENTS 4,553,224 A * 11/1985 Struger ............... G05B 19/054
710/5
5,097,470 A * 3/1992 Gihl ................... G05B 19/0421
700/79

(Continued)

OTHER PUBLICATIONS

Petruzella, "Programmable Logic Controllers 4th Edition, Chapter 5 Basic of PLC programming", 2010, pp. 91. downloaded form the internet https://1.cdn.edl.io/Mfh5aeeQ2evWlpdLYF1Lo4jkYXbJnB1VC8mDbm9pyNJ59aoO.ppt+&cd=14&hl=en&ct=clnk&gl=us (Year: 2010).*

(Continued)

*Primary Examiner* — Brian W Wathen
*Assistant Examiner* — Olvin Lopez Alvarez
(74) *Attorney, Agent, or Firm* — Quinn IP Law

(57) ABSTRACT

A system and method for capturing automation data from an automated system uses a multi-array populated by an automation controller with automation data including timing data defined by a controller clock. The multi-array includes at least one member corresponding to a sensor sensing a state of the member and a plurality of member-defined data elements, which may correspond to a start time and end time of the member state. Automation data is captured from the controller multi-array by a computing device in communication with the controller including a first data table corresponding with the controller multi-array for efficient collection of the automation data from the controller memory, and a second data table for associating each data element with its defining member and storing the associated data in a historical database which may be used for analysis of cycle time data of a member, device or operation of the automated system.

23 Claims, 5 Drawing Sheets

Related U.S. Application Data

(60) Provisional application No. 61/567,208, filed on Dec. 6, 2011.

(56) References Cited

U.S. PATENT DOCUMENTS

| | | | | | |
|---|---|---|---|---|---|
| 5,285,376 | A * | 2/1994 | Struger | ........... | G05B 19/056 700/18 |
| 5,771,374 | A * | 6/1998 | Burshtein | ........... | G05B 19/054 700/11 |
| 5,815,659 | A * | 9/1998 | Umetsu | ........... | G05B 19/418 709/203 |
| 5,991,371 | A * | 11/1999 | Ouchi | ........... | H04M 1/82 379/100.15 |
| 6,327,511 | B1 * | 12/2001 | Naismith | ........... | G05B 19/4185 700/19 |
| 6,499,114 | B1 * | 12/2002 | Almstead | ........... | G05B 19/4184 714/25 |
| 6,535,769 | B1 * | 3/2003 | Konar | ........... | G05B 19/058 700/108 |
| 7,027,954 | B2 * | 4/2006 | Mets | ........... | G05B 23/0221 702/187 |
| 7,117,043 | B1 * | 10/2006 | Frederick | ........... | G05B 19/056 700/21 |
| 7,941,229 | B2 * | 5/2011 | Hildebran | ........... | G05B 19/0423 700/2 |
| 2003/0139837 | A1 * | 7/2003 | Marr | ........... | G05B 23/0278 700/110 |
| 2004/0073404 | A1 * | 4/2004 | Brooks | ........... | G05B 19/409 702/183 |
| 2004/0176864 | A1 * | 9/2004 | Cocco | ........... | G05B 19/4183 700/108 |
| 2008/0215641 | A1 * | 9/2008 | Mukhi | ........... | G05B 21/02 |
| 2009/0248173 | A1 * | 10/2009 | Sasko | ........... | G05B 19/41875 700/9 |
| 2009/0299670 | A1 * | 12/2009 | Hirai | ........... | G05B 19/41865 702/84 |
| 2010/0174387 | A1 * | 7/2010 | Ono | ........... | G05B 19/05 700/23 |
| 2010/0211192 | A1 * | 8/2010 | Stluka | ........... | G06F 16/2477 700/12 |
| 2010/0228888 | A1 * | 9/2010 | Uchi | ........... | G06F 3/0605 710/10 |
| 2011/0254663 | A1 * | 10/2011 | Sakamoto | ........... | G05B 19/4183 340/8.1 |
| 2012/0174120 | A1 * | 7/2012 | Malkiman | ........... | G06F 11/3419 719/313 |

OTHER PUBLICATIONS

Petruzella, Frank D., "Programmable Logic Controllers 4th Edition, Chapter 5 Basics of PLC Programming", textbook pp. 71-94, downloaded from the Internet https://studylib.net/doc/8308149/chapter-5-basics-of-plc-programming, Copyright 2011 by The McGraw-Hill Companies, Inc.

* cited by examiner

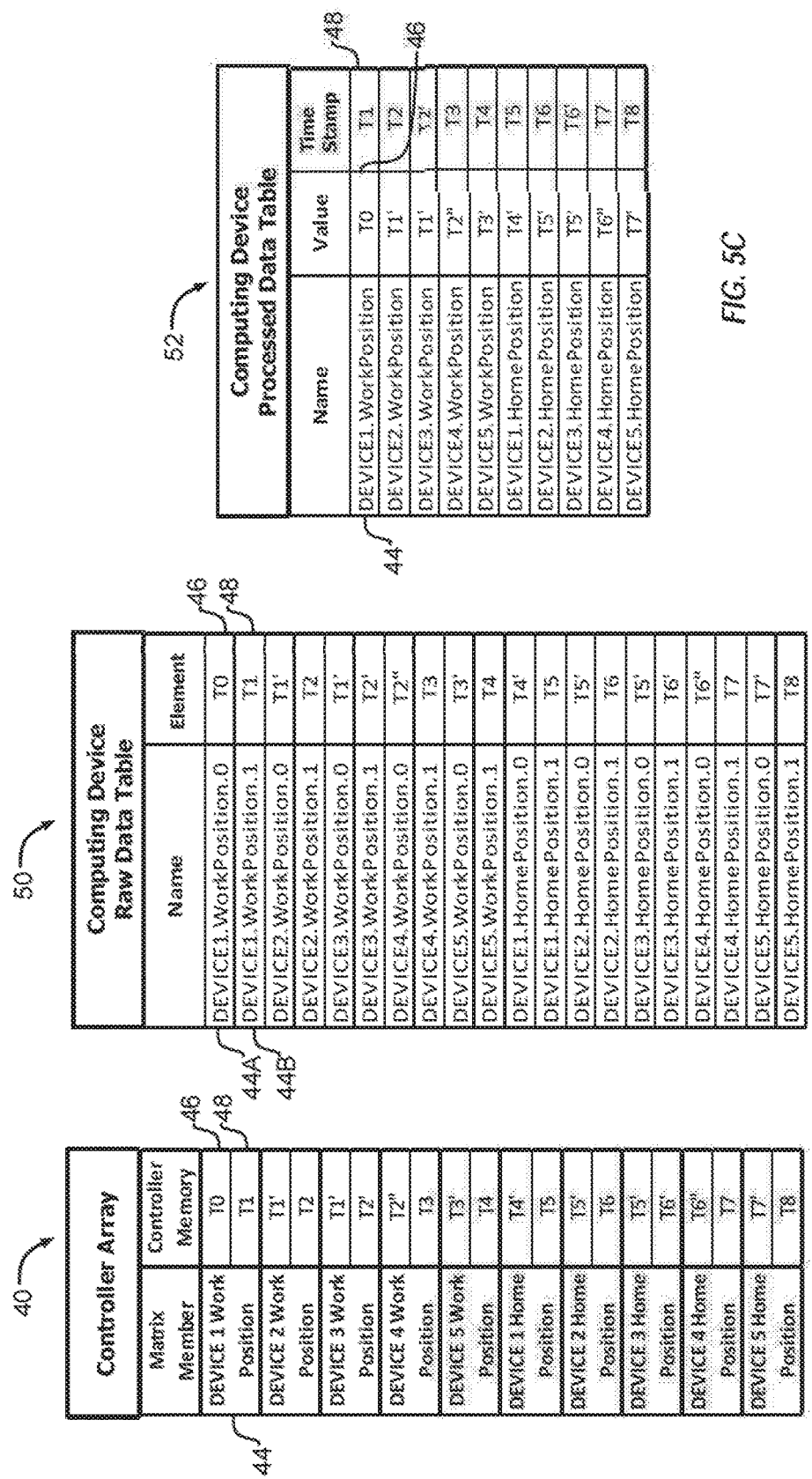

METHOD AND SYSTEM FOR CAPTURING AUTOMATION DATA

CROSS REFERENCES TO RELATED APPLICATION

This Application claims the benefit of U.S. patent application Ser. No. 13/693,758 filed Dec. 4, 2012, and U.S. Provisional Application 61/567,208, filed Dec. 6, 2011, which are each hereby incorporated by reference in their entirety.

TECHNICAL FIELD

The present invention relates generally to collecting and capturing automation data from automated equipment using an automation controller in communication with a computing device.

BACKGROUND

As automation becomes more complex, the number and type of sensors which must be deployed within an automated system to determine if certain states of the automation system exist and to provide input data to automation controllers monitoring and controlling performance of the automated system have dramatically increased. Collecting input data from the increased number of sensors using for example, point to point data collection methods, may require large data structures and memory capacity for storage of the input data including historical automation timing data for cycle time analysis, or may substantially limit collection and analysis of historical automation timing data to partial data derived from a sample of operational cycles which may provide limited analysis of the cycle time behavior and variability of the automated system. Accuracy of the automation data collected may be negatively impacted, for example, by use of a computing device having a slower data capture rate than the scan rate of the automation controller due to point to point data collection methods, computing device configuration, delay in time stamping automation data collected from a controller when the time stamp is determined by the computing device capturing the timing data from the controller, and communication latency between the controller and the computing device.

SUMMARY

A system and method for capturing automation data from automated equipment using a multi-array populated by the automation controller with automation data including timing data defined by a clock of the controller is provided. The automation data included in the multi-array includes at least one member corresponding to at least one sensor of the automated system controlled by the controller, where the sensor may sense a state of an automated operation associated with the member, and a plurality of data elements defined by the member, which may include first and second data elements corresponding to a start time and end time of the member operation. The automation data may include timing data, analog data, or other data defined by the at least one sensor. The automation data is captured, e.g., collected and converted for storage and analysis in a database, by a computing device in communication with the controller, where the computer device includes a first data table configured to correspond with the controller multi-array to provide for efficient collection of the automation data from a multi-array memory location of the controller memory to corresponding table locations of the computing device memory. The computing device may include a second data table for associating each data element with the respective member defining the data element, and for storing the associated data in a database. The data values determined for the data elements may be stored such that the data values are identifiable to at least one of an operational cycle of the automated system, a scan cycle of the controller, and a data capture cycle of the computing device, such that data values associated with a prior one of these cycles may be compared with data values for the same member associated with a current cycle, for analysis of historical data including analysis of cycle time data of a device or operation of the automated system.

The method and system for capturing automation data includes executing a scan cycle using the controller, wherein the scan cycle may be defined by logic provided to the controller to control and monitor the performance of the automated system and collecting input data during the scan cycle from at least one sensor in communication with the controller. The at least one sensor corresponds to at least one member defined by a plurality of elements, wherein each respective element of the plurality of elements has a respective element value determined by the input data. The controller is configured to determine each respective element value for the scan cycle using the respective element and the input data collected during the scan cycle. The method includes configuring a multi-array using the controller, wherein the multi-array includes the at least one member and the plurality of elements defined by the at least one member. Configuring the multi-array may further include allocating a multi-array memory location to store the multi-array in the controller, where the multi-array memory location includes a respective controller memory location for each respective element of the plurality of elements defined by the at least one member. The method continues with storing the element value of each respective element for the scan cycle in the respective controller memory location in the multi-array. The controller is configured to include a controller clock. The method includes determining an element value of at least one element where the element value is configured as timing data and the value of the timing data is determined by the controller clock.

In one example, the scan cycle executed by the controller is defined by a sequence of operations wherein at least one member of the multi-array corresponds to an operation of the sequence of operations, and the plurality of elements defined by the at least one member includes a first element defined by the start of the operation and a second element defined by the end of the operation. The element value of the first element is defined by the start time of operation determined by the controller clock, and the element value of the second element is defined by the end time of the operation determined by the controller clock.

The method further includes providing a computing device in communication with the controller and configuring a first data table using the computing device, wherein configuring the first data table includes storing the respective controller memory location for each respective element in the computing device such that each of the controller memory locations for each respective element is associated with a corresponding location in the first data table to provide a plurality of corresponding locations. The computing device is configured to execute a data capture cycle including reading the multi-array memory location of the controller during the data capture cycle using the computing device and writing each respective element value read from the multi-array memory location of the controller into the corresponding location of the first data table.

The computing device may configure a second data table to process and convert the respective element values of the plurality of elements written into the plurality of corresponding locations of the first data table into the second table such that the at least one member is associated with the respective element values of the plurality of elements defined by the at least one member, such that executing the data capture cycle using the computing device further includes converting the element values written into the first data table into the second data table and storing the second data table in a database using the computing device such that the respective element values of the plurality of elements defined by the at least one member are associated with the at least one member in the database.

The above features and other features and advantages of the present invention are readily apparent from the following detailed description of the best modes for carrying out the invention when taken in connection with the accompanying drawings.

BRIEF DESCRIPTION OF THE DRAWINGS

FIGS. 5A, 5B and 5C are schematic illustrations of a method of capturing data elements stored in the controller multi-array of FIG. 4B from the automated system of FIG. 1 in a first data table of the computing device shown in FIG. 1, for processing into a second data table.

DETAILED DESCRIPTION

Figure 1:
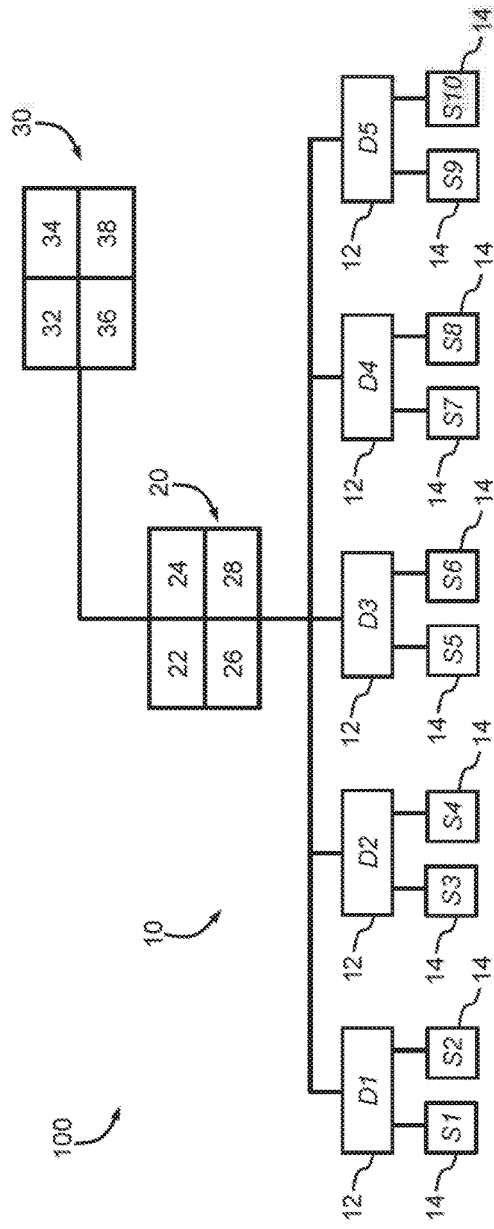
FIG. 1 is a schematic illustration of a system for capturing timing data from an automated system controlled by at least one automation controller.

Referring to the drawings, wherein like reference numbers correspond to like or similar components throughout the several figures, there is shown in FIG. 1 a data capture system generally indicated at 100 for capturing automation data from an automated system generally indicated at 10, and a method for capturing automation data from the automated system 10 using the system 100 is described herein. The system and method for capturing automation data from automated equipment described herein uses a multi-array populated with automation data collected during the scan cycle executed by a controller controlling the automated equipment, where the automation data may include timing data measured, e.g., determined by or time stamped, a controller clock. The multi-array is read by a computing device in communication with the controller during a data capture cycle executed by the computing device, and written into a first data table in the computing device configured to correspond to the multi-array of the controller. Use of a controller multi-array and the controller clock to collect the automation data such that the automation data may be captured by the computing device reading the multi-array into a corresponding data table, then further processing the automation data from the corresponding data table into a second data table for storage in a data base allows for the efficient collection of automation data elements from complex automated equipment including a large quantity of sensors, and efficient collection of automation data from each of the large quantity of sensors for large numbers of representing most, if not all, of the operational cycles of the equipment and/or sensors. Various configurations of the multi-array may be used, as described herein, to allow for storage of automation data including timing data from multiple sets of scan cycles in the multi-array between data capture cycles, wherein the timing data is measured by a controller clock to increase the accuracy of timing data collected from the automated system and increase the accuracy of cycle times determined therefrom.

Still referring to FIG. 1, the automated system 10 may be controlled by logic executed by an automation controller generally indicated at 20. The automated system 10 may include one or more devices 12 and one or more sensors 14 in communication with the controller 20. In the non-limiting example shown in FIGS. 1-2 and 4A-5C, the plurality of devices 12 are individually identified as D1 through D5, and the plurality of sensors 14 are individually identified as S1 through S10, for illustrative purposes. The data capture system 100 may include a computing device 30 in communication with the controller 20. The computing device 30 and controller 20 may be configured in wired or wireless communication, through a shared network, etc., as required to allow data to be transferred between the computing device 30 and controller 20. The example shown is non-limiting, and it would be understood that the number and combinations of devices 12, sensors 14, automation controllers 20, and computing devices 30 may vary in configurations of the automated system 10.

One or more sensors 14 and one or more devices 12 may define a machine (not shown), such that the automated system 10 may include at least one machine. The automated system 10 may include as few as one sensor 14 in communication with a device 12. The automated system 10 may include one or more automation controllers 20 which may be in communication with at least one other controller 20 and/or at least one sensor 14. By way of example, the automated system 10 may include or be configured as a piece of equipment, an assembly or manufacturing line including one or more devices, machines and other automated equipment such as material handling equipment, or may be configured as a factory including one or more assembly lines, manufacturing lines, machines, motors, material handling equipment and/or other devices 12 associated with one or more sensors 14 and controlled by one or more automation controllers 20.

One or more devices 12 may be associated with a single sensor 14. One or more sensors 14 may be associated with a single device 12. By way of non-limiting example, a sensor 14 may be configured as a limit switch, a proximity switch, a photo eye, a temperature sensor, a pressure sensor, a flow switch, or any other type of sensor which may be configured to determine if one or more states are met during operation of the automated system 10, and to provide an output to the at least one automation controller 20 corresponding to the state determined by the sensor 14. The sensor 14 output may be configured, for example, as a signal provided to the controller 20, and received by the controller 20 as an input including input data. The sensor 14 may be configured to provide a discrete or bit-form output. The sensor 14 may be configured as an analog sensor and may provide an analog output signal corresponding to one or more of multiple states of a device 12 or group of devices associated with the sensor 14, or one or more of multiple states of an environment of the automated system 10. A "state" as that term is used herein, may include a state, a condition, a status, a position or other property of one of a device 12, a group of devices 12, a sensor 14, a group of sensors 14, a machine or equipment including one or more devices 12 or one or more sensors 14, or an environment of the automated system 10, which may include an environment in which the one of a device 12 or sensor 14 is operating. Non-limiting examples of a state may include on, off, start, end, stop, open, close, auto, manual, faulted, blocked, starved, high, low, etc. Other non-limiting examples of a state may include an analog value such as a measurement of temperature, pressure, force, distance, time, etc.

The automation controller 20 may be configured to control the operation of the automated system 10, for example, by executing controller logic 28 which may be provided to the automation controller 20. The automation controller 20 may be referred to herein as the controller. The controller logic 28 may be configured in any form suitable for controlling and/or executing operations of the automated system 10, and may be referred to herein as logic. For example, the logic 28 may be provided to the controller 20 as ladder logic, state logic, or other logic expressed in a programming language. The logic 28 may correspond to a sequence of operations or a portion of a sequence of operations 16 (see FIG. 2) performed by the automated system 10, wherein the performance of the sequence of operations 16 may be referred to herein as an operational cycle of the automated system 10. It would be understood that the automated system 10 would, in operation, repeatedly perform the operational cycle comprising the sequence of operations 16 under the control of the controller 20. The controller 20 may be configured to execute a scan cycle (not shown), where the scan cycle may be defined by the sequence of operations 16 and/or the logic 28. During the scan cycle, the controller 20 may provide one or more outputs to the automated system 10, and may receive one or more inputs from the automated system 10. The scan cycle may be executed repeatedly by the controller 20 at a scan frequency, wherein the scan frequency is the time interval at which the automation controller 20 is configured to repeatedly execute the scan cycle. The scan frequency may be defined by a scan rate, wherein the scan rate is defined by the amount of time required to execute the scan cycle, such that when the scan frequency and the scan rate are equal, the scan cycle is executed continuously, e.g., execution of the scan cycle is continuously repeated. The scan frequency may be, but is not required to be, defined by the scan rate. The automation controller 20 may be configured, for example, as a programmable logic controller (PLC).

The controller 20 may include a central processing unit (CPU) 22, which may also be referred to herein as a processor, which may be configured, for example, to execute the logic 28, to process inputs from and outputs to the automated system 10, read, write, and/or store data, which may include values, timing data, time stamps, and/or element data, to a controller memory 26, to configure data matrices 42 and arrays 40, analyze and/or compare data, and/or to interface with a controller clock 24, where interfacing with the controller clock 24 may include time stamping data collected by the controller 20 using a time provided or defined by the controller clock 24, or determining timing data using the controller clock 24. For example, the controller 20 may be configured to time stamp one or more outputs provided by the controller 20 to the automated system 10 during a scan cycle, such that timing data in the form of a time stamp is associated with the respective output provided by the controller 20, where the timing data corresponding to the respective output, e.g., the output time stamp, is a time determined by the controller clock 24 during the scan cycle in which input data is detected or received by the controller 20, thereby providing a timestamp associated with the timing data accurate within the duration of the scan cycle. The controller 20 may be configured to time stamp one or more inputs provided to the controller 20 by the automated system 10 during a scan cycle, such that timing data in the form of a time stamp is associated with the respective input, where the timing data corresponding to the respective input, e.g., the time stamp, is a time determined by the controller clock 24.

The controller memory 26 of the controller 20, at least some of which is tangible and non-transitory memory, can include, by way of example, ROM, RAM, EEPROM, etc., of a size and speed sufficient for executing the logic 28 to control and/or for automation of the automated system 10, for executing a scan cycle, for storing data including input, element, and timing data, for storing one or more multi-arrays 40 and/or data matrices 42 (see FIGS. 3A-3B and 4B-4C) and data members and elements defined therein, for interfacing with the computing device 30, and for operating the controller clock 24.

The computing device 30 may be configured for communication with one or more controllers 20 of the automated system 10. The computing device 30 may include one or more data collectors 34 which may be configured to read, collect, analyze and/or compare data stored in the controller memory 26. The data collector 34 may be configured to read one or more multi-arrays 40 and/or data matrices 42 and element data stored therein, to read, write, collect, analyze, compare, store and/or otherwise manipulate data received from the controller 20, which may include manipulating and storing data to at least one data table 50, 52 (see FIGS. 5B-5C and 6B-6C) and/or storing data to a database 38 configured by the computing device 30.

The computing device 30 may be configured to provide and/or execute a data capture cycle (not shown), where the data capture cycle may include capturing data from a multi-array 40 stored in the controller memory 26. The data capture cycle may be executed repeatedly by the computing device 30 or a data collector 34 of the computing device 30, at a data capture frequency determined by the computing device 30, wherein the data capture frequency is a time interval at which the data collector 34 is configured to repeatedly execute the data capture cycle. The data capture frequency may be defined by a data capture rate, wherein the data capture rate may be defined by the amount of time required to execute the data capture cycle, such that when the data capture frequency and the data capture rate are equal, the data capture cycle is executed continuously, e.g., execution of the data capture cycle is continuously repeated. The data capture frequency may be defined by other factors, which may include, for example, the configuration and amount of data to be captured from the controller 20, and may differ from the data capture rate. The data capture rate may be affected, for example, by the configuration and amount of data to be captured from the controller 20, the configuration of the computing device 30 including the processing speed of the computing device 30, and/or the configuration of the interface through which the controller 20 and the computing device 30 are in communication with each other.

The data capture rate of the computing device 30 may be different than the scan cycle rate of the controller 20. The data capture frequency defined by the computing device 30 may be different from the scan frequency defined by the controller 20. By way of example, the data capture rate may be of longer duration than the scan rate, and the data capture frequency may be a frequency less than the scan frequency. In one example, the data capture frequency and scan frequency may be proportional to each other, wherein the data capture frequency may be defined by the scan frequency. In one example, the scan rate may be 10 milliseconds (ms) and the data capture rate may be 50 ms, such that the scan cycle may be executed five times between subsequent data capture cycles. It would be understood that these examples are non-limiting and scan rates and data capture rates of durations other than those used in examples herein are possible and may be used within the scope of the system and method described herein.

The computing device 30 may include a central processing unit (CPU) 32, which may also be referred to herein as a processor, which may be configured, for example, to configure the data collector 34, to process data received from the controller 20 which may include value, time stamp, timing and/or element data, to read, write, and/or store data to a computing device memory 36, to configure data tables including raw and processed data tables, and/or to analyze and/or compare data which may include determining and storing cycle times defined by the data collected from the controller 20. The memory 36 of the computing device 30, at least some of which is tangible and non-transitory memory, can include, by way of example, ROM, RAM, EEPROM, etc., of a size and speed sufficient for configuring and operating the data collector 34, collecting, analyzing, comparing and storing data including element and timing data, for storing one or more data tables 50, 52 (see FIGS. 5B-5C, 6B-6C) and members and elements defined therein and/or one or more databases 38, and for interfacing with the controller 20.

The example illustrated by FIG. 1 is non-limiting. For example, it would be understood that the functions of the controller 20 may be provided by a single controller 20, or may be distributed among multiple controllers 20 in communication with the computing device 30 and/or each other to provide the functions of the controller 20 as described herein. It would be understood that the functions of the computing device 30 may be provided by a single computing device 30, or may be distributed among multiple computing devices 30 in communication with one or more controllers 20 and/or each other to provide the functions of the computing device 30. For example, one or more of the databases 38 may be distributed among multiple computing devices 30, which may be configured as servers, including third party servers, in communication with one or more computing devices 30 configured to collect data from the one or more controllers 20.

Figure 2:
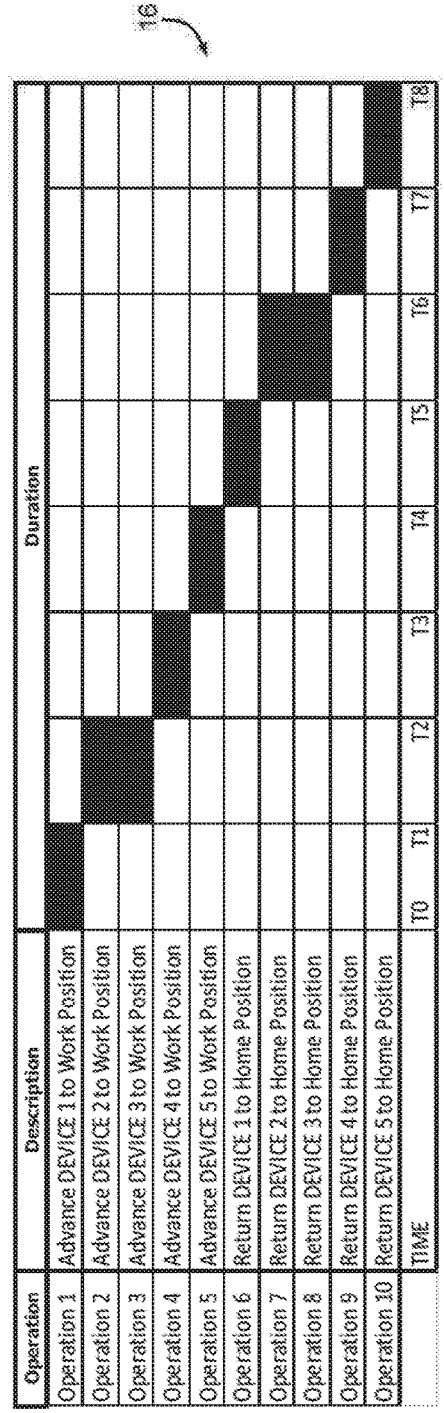
FIG. 2 is a schematic illustration of a sequence of operations associated with the automation controller and automated system of FIG. 1.

A method and system of capturing automation data using the data capture system 100 is provided herein and will be described relative to the example automated system 10 illustrated by FIGS. 1-2 and 4A-5C. It would be understood that the examples shown are non-limiting, and the system and method described herein may be used in various configurations within the scope of the description provided herein and with automated systems 10 having other configurations and combinations of devices 12, sensors 14 and controllers 20 as previously described herein. Referring now to FIGS. 1-2, in the example shown in FIG. 1, each device 12 is associated with two sensors 14, such that device D1 is associated with sensors S1 and S2, device D2 is associated with sensors S3 and S4, device D3 is associated with sensors S5 and S6, device D4 is associated with sensors S7 and S8, and device D5 is associated with sensors S9 and S10. In the example shown in FIGS. 1-2 and 4A-5C, the device D1 of FIG. 1 corresponds to "Device 1" shown in FIGS. 2 and 4A-5C, the device D2 of FIG. 2 corresponds to "Device 2" shown in FIGS. 2 and 4A-5C, and so on. Each of the devices 12 may be configured as any type of pneumatic, mechanical, electrical or electromechanical device which may be used in the automated system 10. In a non-limiting example, the devices D1 through D5, referred to individually as a device 12, may each be configured as a pneumatic drive clamp movable from a first position which may be referred to herein and in the various figures as a home position, to a second position which may be referred to herein and in the various figures as a work position. The position of the device 12 in the current example may be considered a state of the device 12, such that a first state of the device 12 corresponds to the device 12 in the first (home) position, and a second state of the device 12 corresponds to the device 12 in the second (work) position.

In the example shown, the sensors S1 through S10 may be proximity sensors configured to sense a state of the respective device D1 through D5 with which they are associated. Using the sensors S1, S2 and device D1 to describe the operation of each respective associated set of sensors and devices (S1, S2, D1), (S3, S4, D2), (S5, S6, D3), (S7, S8, D4) and (S9, S10, D5), in the example shown in FIGS. 1-2 and 4A-5C, the sensor S1 may be configured to sense when device D1 reaches the home position, such that when device D1 is moved to and/or reaches the home (first) position, the sensor S1 sends an output to the controller 20. The output from the sensor S1 may be an electrical signal which may be received as an input by the controller 20, for example, during execution of a scan cycle which includes monitoring and/or controlling the movement of the device D1. The sensor S2 may be configured to sense when device D1 reaches the work (second) position, such that when device D1 is moved to and/or reaches the work position, the sensor S2 sends an output to the controller 20. The output from the sensor S2 may be an electrical signal which may be received as an input by the controller 20, for example, during execution of a scan cycle which includes monitoring and/or controlling the movement of the device D1. The controller 20 may be configured to send an output to the device D1 to advance from the home position to the work position or to return to from the work position to the home position, as defined by the logic 28 and/or the respective inputs received from the sensors S1, S2. Similarly, sensors S3, S4 may be respectively configured to sense when the respective home and work positions of device D2 are reached by the device D2, and so on.

Referring to FIG. 2, shown is an example sequence of operations generally indicated at 16. The controller 20 may be configured with controller logic 28 corresponding to the sequence of operations 16 for control and monitoring of the automated system 10 of FIG. 1 using a scan cycle corresponding to the sequence of operations 16 and the controller logic 28. The sequence of operations 16 includes a listing of operations, including Operation 1 through Operation 10, a description of each operation, and a duration of each operation. For example, the first operation, identified in the sequence of operations 16 as Operation 1, is described as "Advance Device 1 to Work Position," where the controller 20 provides an output to trigger the start of Operation 1 at start time T0. The timestamp of the start time T0 may be determined by the controller clock 24 and recorded by the controller 20 into a multi-array 40 (see FIGS. 4B-4C). The multi-array 40 may be configured to receive automation data corresponding to the sequence of operations 16, as described in further detail herein. The multi-array 40 is stored in the controller memory 26, in a memory location in the controller memory 26 allocated to the multi-array 40.

When Operation 1 ends, e.g., when Device 1 is advanced from the Home Position (first state) and reaches the Work Position (second state), the sensor S2 is triggered and generates an output which is detected as input data by the controller 20 during execution of a scan cycle at a time T1, where time T1 is identified as the end time of Operation 1 and is measured by a timestamp determined by the controller clock 24 and corresponding to the time the controller 20 detects the input data from the sensor S2 signaling Device 1 in the Work Position. The controller 20 stores the timing data, e.g., the timestamp for end time T1 to a designated location in the multi-array 40 and controller memory 26.

Figures 3A, 3B:
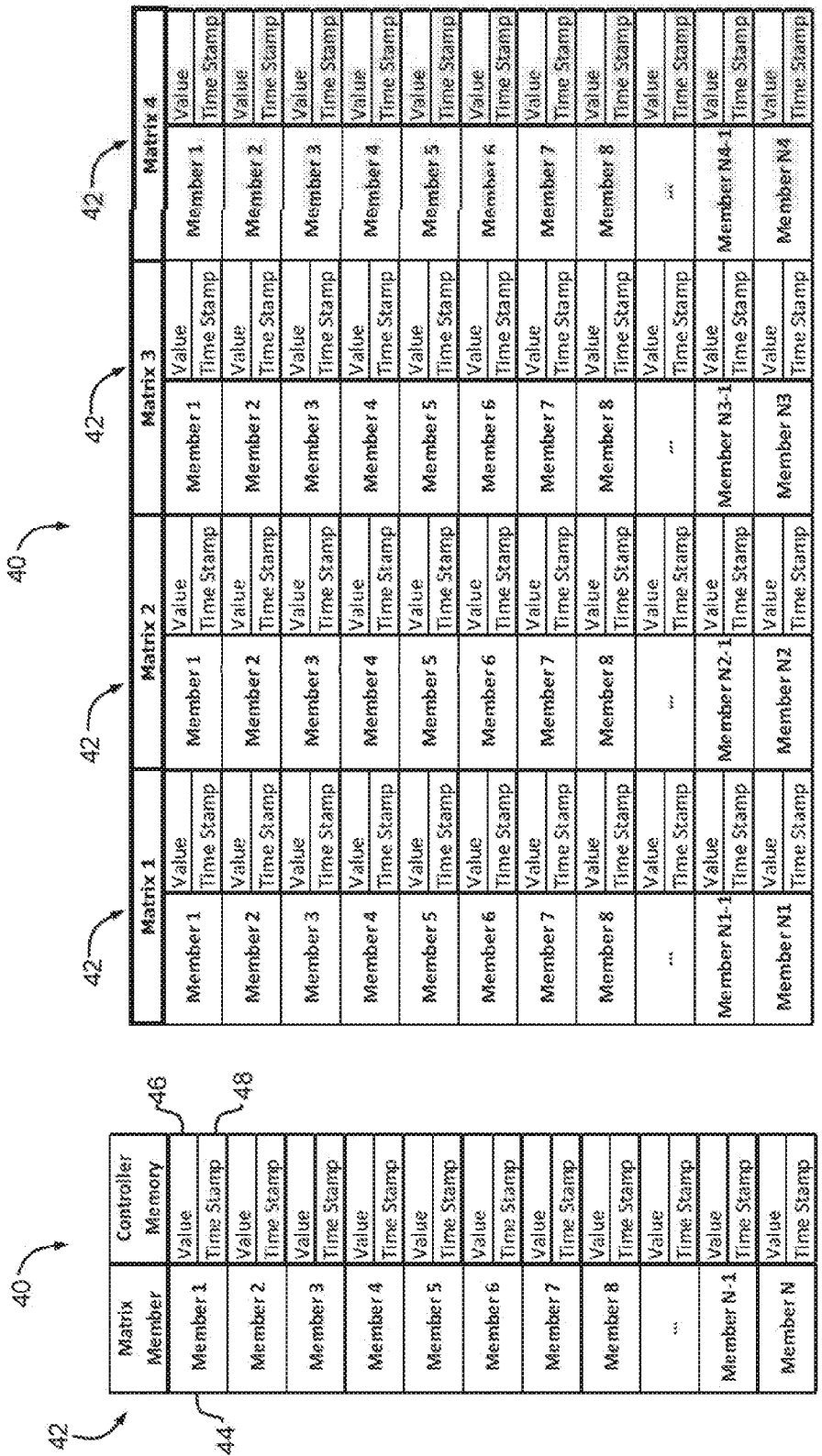
FIG. 3A is a schematic illustration of an example configuration of a controller multi-array including a data matrix.
FIG. 3B is a schematic illustration of an example configuration of a controller multi-array including a set of data matrices.
Figures 4A, 4B, 4C:
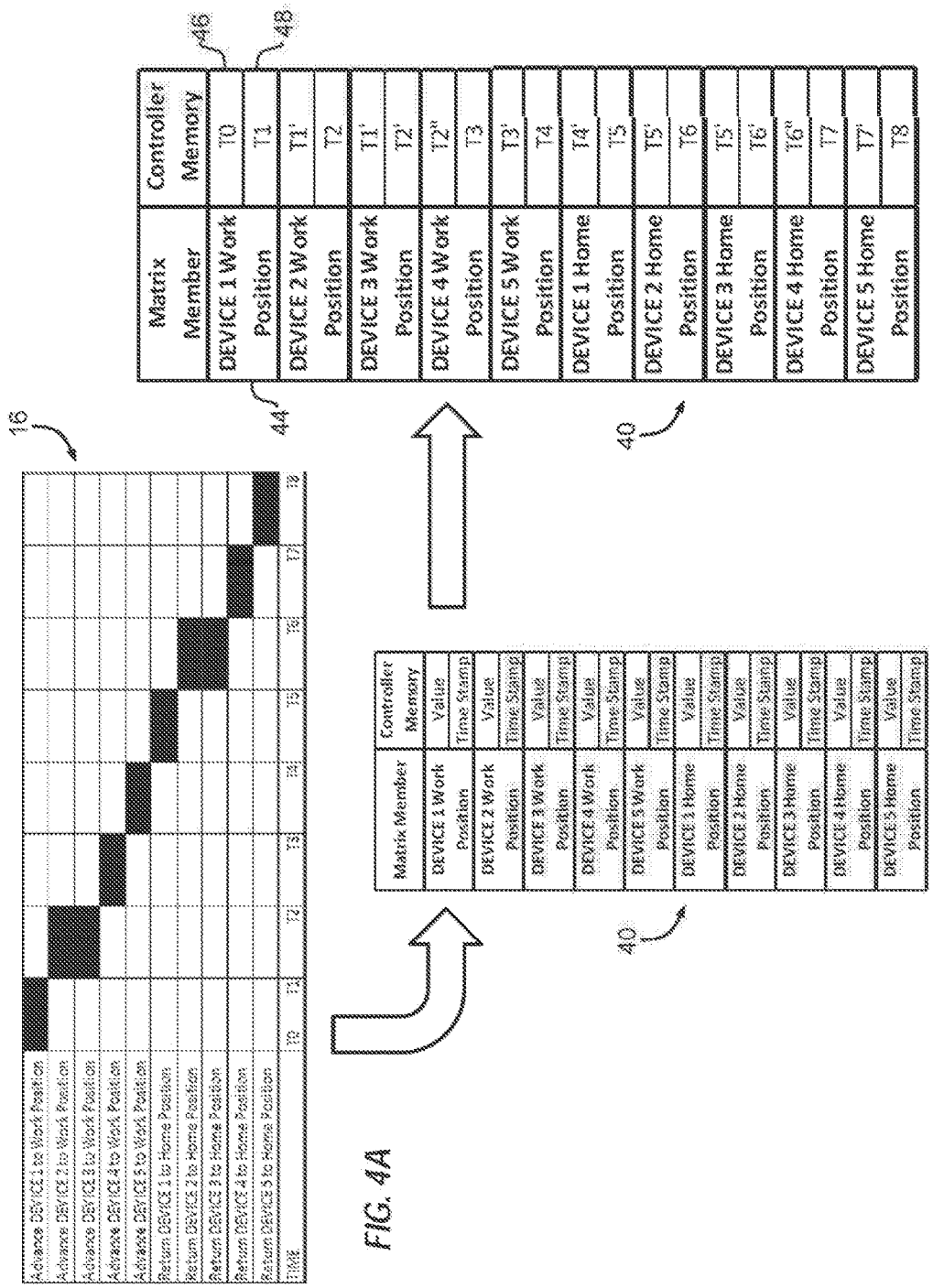
FIG. 4A is a schematic illustration of the sequence of operations shown in FIG. 2.
FIG. 4B is a schematic illustration of a controller multi-array defined by the sequence of operations shown in FIG. 2.
FIG. 4C is a schematic illustration of the controller array of FIG. 4B populated with data elements collected by the controller of FIG. 1.

Referring now to FIGS. 3A and 4B-4C, FIG. 3A shows an example multi-array 40 including a data matrix 42. The data matrix 42 includes at least one member 44 and a plurality of data elements 46, 48 defined by the at least one member 44. As shown in the example of FIG. 3A, the data elements 46, 48 may be configured in the controller 20 in a value-timestamp format or as a value-timestamp pair, although this designation and/or terminology is not intended to be limiting. As shown in the example herein, each value of the respective data elements 46, 48 defining the value-timestamp pair, e.g., each respective value of the first and second data elements 46, 48 may be configured as timing data, such that the data element pair 46, 48 defines a start and end time corresponding to the member 44 defining the data element pair 46, 48. The member 44 is defined by the automated system 10 and corresponds to at least one sensor 14 included in the automated system 10 and in communication with the controller 20. For example, the member 44 may correspond to one or more sensors 14, or to one or more sensors 14 in communication with and/or configured to sense and/or monitor at least one of a device 12, an operation performed by the automated system 10, or a sub-system of the automated system 10, such as an assembly or manufacturing line, a machine including at least one device 12, a group of devices 12, etc.

FIGS. 4B-4C show a multi-array 40 configured for use in capturing automation data from the automated system 10 performing the sequence of operations 16 shown in FIG. 2. As shown in FIGS. 4B-4C, the multi-array 40 consists of a single data matrix 42, where each member 44 of the multi-array 40 is associated with a respective operation of the sequence of operations 16 and each member 44 defines a first element 46 corresponding to the start time of the respective operation and defines a second element 48 corresponding to the end time of the respective operation. As such, each member 44 of the multi-array 40 is associated with at least one sensor 14 of the automated system 10, where the associated sensor 14 provides input data to the controller 20 to determine the respective start and end times defining first and second elements 46, 48. For example, the first member 44 of the multi-array 40 shown in FIG. 4C is associated with Operation 1 of the sequence of operations 16, is labeled "Device 1 Work Position" in the multi-array, and is defined by a start time T0 (first element 46) and an end time T1 (second element 48). The second member 44 of the multi-array 40 is associated with Operation 2 of the sequence of operations 16, is labeled "Device 2 Work Position" in the multi-array, and is defined by a start time T1' (first element 46) and an end time T2 (second element 48). The multi-array 40 is configured to include a member 44 corresponding to each of the ten operations Operation 1 through Operation 10, and a first and second element 46, 48 defined respectively by the start and end time of the respective operation.

Referring again to FIG. 2, upon detecting the end of Operation 1 at end time T1, the controller 20, following the sequence of operations 16, triggers Operations 2 and 3 to start at the same start time T1' (see FIG. 4C), such that Operations 2 and 3 may be considered concurrent operations and/or Devices 2 and 3 may be referred to as a group of devices. The start time T1' is measured by the controller clock 24 and recorded by the controller 20 in multi-array 40 in the respective start location time as the element value of the respective first data elements 46 defined by the respective members "Device 2 Work Position" associated with Operation 2 and "Device 3 Work Position" associated with Operation 3. When Operation 2 ends, e.g., when Device 2 is advanced to and reaches the Work Position, sensor S4 is triggered and generates an output which is detected as input data by the controller 20 during a scan cycle at an end time T2 determined by the controller clock 24. The end time T2 is measured by the controller clock 24 and recorded by the controller 20 in multi-array 40 in the end time location as the element value of the second data element 48 defined by the second member 44 labeled "Device 2 Work Position." Similarly, when Operation 3 ends, e.g., when Device 3 is advanced to and reaches the Work Position, sensor S6 is triggered and generates an output which is detected at time T2' as input data by the controller 20. The end time T2' is measured by the controller clock 24 and recorded by the controller 20 in multi-array 40 in the end time location as the element value of the second data element 48 of the third member 44 labeled "Device 3 Work Position."

Upon detecting the completion of the group of concurrent Operations 2 and 3, the controller 20, following the sequence of operations 16, triggers Operation 4 at a time T2" (see FIG. 4C). The time T2" is measured by the controller clock 24 and recorded in the multi-array 40 in the start time location as the element value of the first data element 46 of the fourth member "Device 4 Work Position" associated with Operation 4. When Operation 4 ends, e.g., when Device 4 is advanced to and reaches the Work Position, sensor S8 is triggered and generates an output which is detected as input data by the controller 20 during a scan cycle at an end time T3 determined by the controller clock 24. The end time T3 is measured by the controller clock 24 and recorded by the controller 20 in multi-array 40 in the end time location as the element value of the second data element 48 defined by the fourth member 44 labeled "Device 4 Work Position."

Upon detecting the completion of Operation 4 at time T3, the controller 20, following the sequence of operations 16, triggers Operation 5 at a time T3' (see FIG. 4C). The time T3' is measured by the controller clock 24 and recorded in the multi-array 40 in the start time location as the element value of the first data element 46 of the fifth member "Device 5 Work Position" associated with Operation 5. When Operation 5 ends, e.g., when Device 5 is advanced to and reaches the Work Position, sensor S10 is triggered and generates an output which is detected as input data by the controller 20 during a scan cycle at an end time T4 determined by the controller clock 24. The end time T4 is measured by the controller clock 24 and recorded by the controller 20 in multi-array 40 in the end time location as the element value of the second data element 46 defined by the fifth member 44 labeled "Device 5 Work Position."

As shown by FIGS. 1 and 4A-4C, the controller 20, upon detecting the completion of Operation 5 at end time T4, triggers the start of Operation 6 "Return Device 1 to Home Position" at start time T4'. The start time T4' is measured by the controller clock 24 and recorded as the element value of the first element 46 defined by the sixth member 44 labeled "Return Device 1 to Home Position." When Operation 6 ends, e.g., when Device 1 is returned to and reaches the Home Position, sensor S1 is triggered and generates an output which is detected as input data by the controller 20 during a scan cycle at an end time T5 determined by the controller clock 24, which is recorded in the multi-array 40 as the element value of the second element 48 of the sixth member 44 labeled "Return Device 1 to Home Position."

The process repeats in the same manner for the remaining operations Operation 7 through Operation 10 respectively associated with the seventh through tenth members of the multi-array 40, with the controller 20 continuing to execute the scan cycle at the scan frequency defined by the controller, wherein executing the scan cycle includes triggering each subsequent operation of the sequence of operations 16 using the logic 28 provided to the controller 20 upon detection of completion of the prior operation by the controller 20, recording a respective start time (T5', T5', T6", T7' as shown in FIG. 4C) measured by the controller clock 24, storing each of the respective start times in the multi-array 40 as a respective element value of a respective first element 46 of a respective member 44 associated with a respective Operation 7 through 10, detecting sensor input data provided by a respective sensor S3, S5, S7, S9 during the scan cycle indicating the respective Device D7 through D10 has returned to its Home Position, recording a respective end time (T6, T6', T7, T8 as shown in FIG. 4C) corresponding to respective sensor input data received by the controller 20 during a scan cycle, where each of the respective end times is measured by the controller clock 24, and storing each of the respective end times in the multi-array 40 as a respective element value of a respective second element 48 of a respective member 44 associated with a respective Operation 7 through 10. As shown in FIGS. 4A-4C, Operations 7 and 8 are concurrent operations, both triggered by the controller to start at the same start time T5'.

The controller 20 may continue to execute the controller logic 28 and scan cycle such that the automated system 10 continues to repeat the sequence of operations 16, wherein each performance of the sequence of operations 16 by the automated system 10 may be referred to as an operational cycle of the automated system 10. The controller 20 updates the values of each of the elements 46, 48 in the multi-array 40 according to the scan frequency and the input data received by the controller 20 from the at least one sensor 14 associated with the respective element 46, 48 and stores the updated value of each element 46, 48 in the controller memory location corresponding to that element 46, 48. In the example shown, the scan rate may be 10 ms, e.g., the controller may have a scan time of 10 ms to complete one scan cycle, and the scan frequency may be equal to the scan rate such that the controller 20 monitors and/or updates each of the element values of the first and second elements 46, 48 in the multi-array 40 every 10 milliseconds (ms). To provide storage, memory and scan cycle efficiency, the controller 20 may be configured to compare the element value stored in a controller memory location corresponding to the data element 46, 48 defining that element value, e.g., a prior element value of the respective data element 46, 48, to the current element value of the respective data element 46, 48 collected during a current scan cycle, to determine whether the current element value is changed from the prior element value. If no change has occurred, the prior element value remains stored in the controller memory location for the respective element 46, 48. If the current element value is changed from the prior element value, the element value stored in the controller memory location is updated by storing the current element value in the controller memory location for the respective element 46, 48.

As will be discussed in additional detail herein, the computing device 30 may be configured to execute a data capture cycle which includes reading and collecting data stored in the multi-array 40 and storing the collected data to a first data table configured in the memory 36 of the computing device 30 to correspond to the multi-array 40, where the first data table may be configured, for example, as a raw data table 50 shown in FIG. 5B and corresponding to the multi-array 40 shown in FIG. 5A. The data capture rate of the computing device 30 may be of longer duration than the scan rate of the controller 20, and/or the data capture frequency defined by the computing device 30 may be less than the scan frequency of the controller 20 such that the element value of each element 46, 48 in the multi-array 40 may change at least once between data capture cycles. For example, referring now to FIGS. 5A and 5B and assuming for example that the scan rate is 10 ms and equal to the scan frequency, and the data capture rate is 50 ms and equal to the data capture frequency, it would be understood that five scan cycles would be completed in the elapsed time between data capture cycles, such that the element values may change up to 5 times between subsequent data capture cycles.

To prevent loss of the automation data including timing data represented by the element values stored to the multi-array 40 between data capture cycles, e.g., to allow collection of automation data including timing data from most or all of the operational cycles performed by the automated equipment 10, other configurations of the multi-array 40 may be used to capture automation data including timing data from the sensors 14 at different frequencies and time intervals. For example, the multi-array 40 may be configured such that each sensor 14 or each operation of the sequence of operations 16 may be associated with a set of members 44 in the multi-array 40, to allow flexibility in the data capture method and to increase the number of operational cycles of the automated system 10 from which automation data including timing data may be collected. In one example, a set of members 44 may be associated with a set or pattern of scan cycles from which element values are recorded into the multi-array 40. By way of illustrative example, a set of scan cycles may include five sequential scan cycles executed by the controller 20, where each scan cycle has a scan rate of 10 ms and the scan cycles are executed at a scan frequency equal to the scan rate, such that the set of five scan cycles is repeatedly executed by the controller 20 every 50 ms. The set of members 44 may include five members 44, where each of the five members 44 is each associated with the same sensor 14 or operation and with a different scan cycle of the set of scan cycles.

For example, the set of members 44 may be associated with an operation such as Operation 4 "Advance Device 4 to Work Position" and sensor S8 configured to sense when Device 4 is advanced to the work position. Now referring to the multi-array 40 shown in FIGS. 3A and 6A, each of Members 4 through 8 may be associated with Operation 4 and a different scan cycle of the set of scan cycles such that Member 4 may include first and second elements 46, 48 corresponding to the start time T2" and end time T3 recorded during the first scan cycle of the set of five scan cycles, Member 5 may include first and second elements 46, 48 corresponding to the start time T2" and end time T3 recorded during the second scan cycle of the set of five scan cycles, Member 6 may include first and second elements 46, 48 corresponding to the start time T2" and end time T3 recorded during the third scan cycle of the set of five scan cycles, Member 7 may include first and second elements 46, 48 corresponding to the start time T2" and end time T3 recorded during the fourth scan cycle of the set of five scan cycles, and Member 8 may include first and second elements 46, 48 corresponding to the start time T2" and end time T3 recorded during the fifth scan cycle of the set of five scan cycles.

Figures 6A, 6B, 6C:
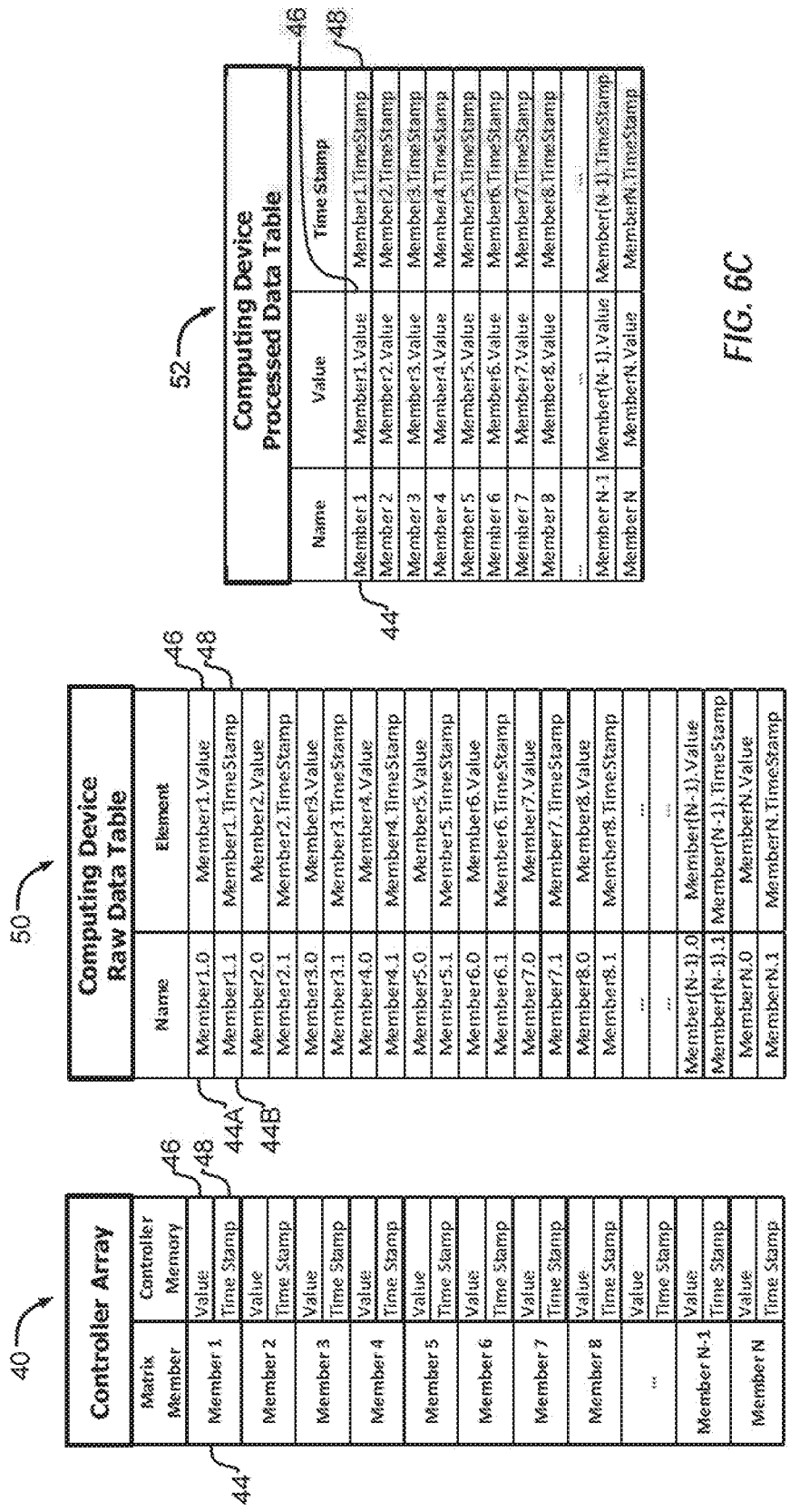
FIGS. 6A, 6B and 6C are schematic illustrations of an example method of capturing data elements stored in the example controller multi-array of FIG. 3A in an example first data table of a computing device in communication with the controller, for processing into an example second data table.

Using the example of a data capture cycle executed by the computing device every 50 ms, a raw data table 50 may be configured to correspond with the multi-array 40 described in the present example, such that the raw data table 50, which may also be referred to herein as a first data table, would include locations corresponding to each of the data elements 46. 48 in the multi-array 40, e.g., would include locations to receive the element values of each of the data elements 46, 48 defined by each member 44, e.g., defined by each of Members 1 through Members N shown in FIGS. 3A and 6A, including each of Members 4 through 8 each associated with a different scan cycle of the set of five scan cycles of Operation 4 executed by the controller 20 between subsequent data capture cycles executed by the computing device 30.

Other configurations of the multi-array 40 may be used to collect automation data, including timing data, from scan cycles executed by the controller 20 between subsequent data capture cycles executed by the computing device 30. For example, and referring to 3B, the multi-array 40 may be configured to include a plurality of data matrices 42, identified as Matrix 1 through Matrix 4, wherein each of the data matrices 42 is configured to collect automation data from the scan cycle executed by the controller 20 at a collection frequency defined by one or more predetermined time intervals or by a predetermined set or pattern of scan cycles executed by the controller 20. In one example, each of the data matrices 42 of the multi-array 40 shown in FIG. 3B may be configured as shown for the data matrix 42 of FIG. 4C corresponding to the automated system 10 and sequence of operations 16 of FIGS. 1 and 2. The controller 12 may be configured to define a collection frequency for the multi-array 40 such that automation data collected during a first scan cycle of a set of four scan cycles is stored in Matrix 1 of the multi-array 40 (see FIG. 3B), automation data collected during a second scan cycle of the set of scan cycles is stored in Matrix 2, automation data collected during a third scan cycle of the set of scan cycles is stored in Matrix 3, and automation data collected by the controller 20 during a fourth scan cycle of the set of scan cycles is stored in Matrix 4. A first data table 50 configured by the computing device 30 to correspond to the multi-array 40 shown in FIG. 3B would be used to receive the automation data read by the computing device 30 from the four data matrices 42 during each data capture cycle executed by the computing device 30. Therefore, automation data from four scan cycles corresponding to four operational cycles of the sequence of operations 16 would be collected during each data capture cycle, thereby increasing data collection efficiency and the number of operational cycles of automation data collected as a proportion of the number of total operational cycles performed by the automated system 10. In another example, each of the data matrices 42 of the multi-array 40 may be configured to collect data from scan cycles executed at defined intervals. For example, Matrices 1, 2, and 3 may be configured to collect automation data from scan cycles at subsequent 10 ms intervals, and Matrix 4 may be configured to collect automation data from all scan cycles such that the automation data may be constantly updated in Matrix 4.

The example shown in FIG. 3B is non-limiting, and it is understood that the plurality of data matrices 42 included in the multi-array 40 may number more or less than the four data matrices 42 shown in the example provided herein to provide flexibility in data collection relative to scan rates, data capture rates, data storage configuration, communication network configuration, etc. Each of the matrices 42 of the multi-array 40 may be configured to include multiple members 44 corresponding to a sensor 14, as previously discussed. Each matrix 42 of the multi-array 40 may include a different set of members 44 and data elements defined thereby. For example, and referring again to the multi-array shown in FIG. 3B, Matrix 1 may include a first set of N1 members 44 which may differ from the second, third and fourth sets of N2, N3, N4 members 44 respectively included in Matrices 2, 3 and 4. For example, the first set of N1 members included in Matrix 1 may correspond to the plurality of devices D1-D5 and sensors S1-S10 and sequence of operations 16 shown in FIGS. 1-2, the second set of N2 members included in Matrix 2 may correspond to one or more sensors associated with a machine (not shown) included in the automated system 10, the third set of N3 members included in Matrix 3 may correspond to one or more sensors associated with an assembly or manufacturing line (not shown) included in the automated system 10, wherein the data elements defined by each of the members of the three sets of members N1, N2, N3 define automation data associated with the respective automated operations performed by the automated system 10. The fourth set of N4 members included in Matrix 4 may correspond with a plurality of sensors 14 configured to sense the operating environment of the automated system 10, such that the data elements defined by each of the members of member set N4 may represent values other than timing data. Non-limiting examples of members and data elements defining values other than timing data may include sensors configured to monitor or sense environmental factors such as ambient temperature, air pressure or humidity, light intensity, machine temperatures, fluid temperature, pressure or flow, etc.

Referring now to FIGS. 5A-5C and 6A-6C, shown is a multi-array 40 configured by the controller 20, a first or raw data table 50 configured by the computing device 30 to correspond to the multi-array 40, and a second or processed data table 52 configured by the computing device to receive data processed from the first data table 50 and associated with an operation or member of the automated system 10 such that the processed data may be saved to a database 38 and/or further analyzed by the computing device 30, for example, to determine a cycle time corresponding to an operation, device 12, or member 44 of the automated system 10. FIGS. 5B-5C illustrate configurations of first and second data tables 50, 52 corresponding to the multi-array 40 shown in FIGS. 5A and 4C defined by the example sequence of operations 16 shown in FIG. 2. FIGS. 6B-6C illustrate configurations of the first and second data tables 50, 52 corresponding to the multi-array 40 including a single data matrix 42 shown in FIGS. 6A and 3A.

The examples shown in FIGS. 5A-6C are non-limiting, and other configurations of the first and second data tables 50, 52 may be provided by the computing device 30 to correspond to a multi-array 40 configured by the controller 20. For example, a first and second data table 50, 52 may be configured by the computing device 30 to correspond with the multi-array 40 shown in FIG. 3B, such that data element values defined by each respective data element 46, 48 of each respective member 44 of each respective data matrix 42 of the multi-array 40 collected by the controller 20 has a corresponding location in the first data table 50 configured by the computing device 30, and such that the computing device 30 may configure a second data table 52 to receive data processed from the first data table 50 for association with its respective member 44 and storage in the database 38.

As described previously, the computing device 30 may be configured to execute a data capture cycle to collect element values from the multi-array 40 stored in the controller memory 26, and to write the captured data into a first data table 50 configured by the computing device 30 to correspond to the multi-array 40. The computing device 30 may include a data collector 34 configured to execute the data capture cycle at a data capture frequency, which may, but is not required to be, equivalent to a data capture rate defined by the data capture cycle. The data capture rate may be further defined and/or affected by the configuration of the computing device 30, the configuration of the communications network or method of communication through which the computing device 30 and the controller 20 are in communication with each other, etc.

The multi-array 40 is configured by the controller 20 to include at least one member 44 and a plurality of elements 46, 48 defined by the at least one member 44. The multi-array 40 is configured such that a memory location is allocated in the controller memory 26 to store the multi-array 40, where the memory location storing the multi-array 40 may be referred to herein as the multi-array memory location. Within the multi-array memory location, a respective controller memory location is defined for each of the respective elements 46, 48 defined by each respective member 44 of the multi-array 40. The size of the memory for each element 46, 48 may be a byte, a word, or more, as required to store the element value defined by the respective element.

The first data table 50 is configured by the computing device 30 to correspond with the configuration of the multi-array 40 from which the computing device 30 will collect data using the data capture cycle. The first data table 50, also referred to as the raw data table, is configured to receive an element value for each respective element 46, 48 read by the computing device 30 from the multi-array 40 during a data capture cycle, such that the element value may be written by the computing device 30 into the raw data table 50 in a table location defined by the raw data table 50 and corresponding to the controller memory location for that respective element 46, 48. Configuring the raw data table 50 may include storing the respective controller memory location for each respective element 46, 48 in the computing device 30, such that each of the controller memory locations for each respective element 46, 48 is associated with a corresponding location in the first data table 50 to provide a plurality of corresponding locations defined by the first data table 50 and stored in the computing device memory 36. As shown in FIGS. 5A-5B and FIGS. 6A-6B, the first data table 50 may be configured differently from the multi-array 40, which may include, as shown in the referenced figures, providing more than one location 44A, 44B to identify the member 44 associated with each of the table locations allocated in the data table 50 as corresponding to the elements 46, 48.

By configuring the data capture cycle such that the computing device 30 reads the multi-array 40, e.g., reads the multi-array memory location allocated for the multi-array 40 in the controller memory 26, and writes the element values read from the controller memory locations of the multi-array memory location into the corresponding table locations of the raw data table 50, data capture efficiencies can be realized using the multi-array 40 and table data structures described herein, as compared to reading and storing individual data points using a point to point data collection method. To provide efficiency of data storage, use of memory and data capture rates, the computing device 30 may be configured to compare, during a current data capture cycle, the prior element value stored in a table location of the first data table 50 during a prior data capture cycle with the current element value stored in the corresponding controller memory location of each respective data element 46, 48, where the current element value is the element value read from the multi-array 40 during a current data capture cycle, to determine whether the current element value is changed from the prior element value. If no change has occurred, the prior element value remains stored in the first table location in the computing device memory 36 for the respective element 46, 48. If the current element value is changed from the prior element value, the element value stored in the corresponding first table location in the computing device memory 36 is updated by storing the current element value in the first table location in the computing device memory 36 corresponding to the controller memory location for the changed respective element 46, 48.

Referring again to FIGS. 5A-5C and 6A-6C, the computing device 30 may configure a second data table 52, which may be referred to herein as a processed data table 52, to convert the respective element value from the first data table 50 to the second data table 52 such that each of the respective element values read into the first data table 50 during the data capture cycle is associated in the second data table 52 with the member 44 defining the element 46, 48 corresponding to the respective element value. For example, as shown in FIGS. 5A-5C, in response to input data received by the controller 20 during a scan cycle, the controller 20 may determine element values respectively corresponding to the start time and end time T0, T1 for the operational cycle of Operation 1 scanned during the scan cycle, and store these element values to their respective controller memory locations allocated in the controller memory 26 for the first and second elements 46, 48. During a subsequent data capture cycle, the computing device 30 reads the multi-array 40 and collects the element values of the start time and end time T0, T1 determined for the operational cycle of Operation 1 scanned by the controller 20 and stored in the multi-array memory location, and writes these element values to the raw data table 50. The raw data table 50 has been configured, for example, to provide a first table location associated with a name 44A shown as "Device1.WorkPosition.0", where the first table location corresponds to the first element 46 defined by the member 44 "Device 1 Work Position." The element value of the start time T0 read from the multi-array 40 is written to the first table location corresponding to the first element 46. Similarly, a second table location is associated with a name 44B shown as "Device1.WorkPosition.1", where the second table location corresponds to the second element 48 defined by the member 44 "Device 1 Work Position." The element value of the end time T1 read from the multi-array 40 is written to the table location shown in FIG. 5B corresponding to the second element 48 defined by the member 44 "Device 1 Work Position."

The computing device 30 may process the first data table 50 to convert the element values for the start and end times T0, T1 stored in the first data table 50 to the second data table 52. As shown in FIG. 5C, the second data table includes the first member 44 named "Device1.WorkPosition" associated with the first and second elements 46, 48 defined by the member 44 respectively as the start time and end time T0, T1 of Operation 1 described as "Advance Device 1 to Work Position" in FIG. 2, where the first member 44 corresponds to Operation 1. The element values, e.g., the timing data or timestamps, written into the first data table 50 for the start and end times T0, T1 of the operational cycle scanned to determine the start and end times T0, T1 for that operational cycle are converted by the computing device 30 and associated with the member "Device1.WorkPosition." The second data table 52 including the element values of the start and end times T0, T1 for the scanned operational cycle may be stored in a database 38 using the computing device 30, and/or the element values of the start and end times T0, T1 determined for the scanned operational cycle may be associated, for example, with metadata identifying the associated member 44 and operational cycle from which the start and end times T0, T1 were determined. To complete the data capture cycle, the computing device 30 may read the remaining element values of the remaining data elements T1' through T8 shown in the multi-array 40 of FIG. 5A from the multi-array 40, write these remaining element values into the first data table 50 shown in FIG. 5B, convert the remaining element values into the second data table 52 for association with the respective member 44 corresponding to each remaining element value, and store the converted element values such that they are associated with the respective member 44 corresponding to each element value and the operational cycle and/or scan cycle from which the stored element value was determined. The data capture cycle may be repeated such that element values associated with subsequent operational cycles of the sequence of operations 16 performed by the automated system 10 and/or determined by subsequent scan cycles executed by the controller 10 may be converted for association with the respective member defining the element 46, 48 and element value, and stored to provide a history of element values for that element 46, 48.

The computing device 30 may be configured to analyze the element values, which may include analyzing the start time and end time values of a member 44 for an operational cycle or scan cycle to determine a cycle time for the member 44. For example, a cycle time of Operation 1 may be calculated by determining the difference between the element value (timing data or time stamp) of the start time T0 and the element value (timing data or time stamp) of the end time T1, wherein each of these values is determined using the controller clock 24 and input data received by the controller 20 during execution of a scan cycle and/or performance of an operational cycle of the sequence of operations 16. The cycle time and/or related timing data for that operational/scan cycle may be stored in the database 38, as described previously, as a prior operational/scan cycle. The data capture cycle may be repeated according to the data capture frequency to convert and store timing data from a plurality of prior operational cycles to provide historical cycle time and timing data stored to the database 38. Cycle time and/or related timing data for a current operational cycle may be determined for analysis and/or comparison with the historical data by the computing device 30.

The illustrative examples described herein are intended to be non-limiting. For example, at least one of the devices 12 may be dissimilar from the other devices 12, and at least one of the sensors 14 may be dissimilar from the other sensors 14. The automated system 10 may be arranged such that a single sensor 14 may be configured and used to sense the first state and the second state of an associated device 12 and to output a signal corresponding to the sensed one of the first and second state. A single sensor 14 may be configured to sense a designated state of a group of devices 12, and to output a signal corresponding a sensed state of the group of devices 12. In one example, the sensed state of the group of devices 12 triggering an output from the sensor 14 may correspond to the sensor 14 sensing a first device 12 of the group of devices 12 reaching the designated state. In another example, the sensed state of the group of devices 12 triggering an output from the sensor 14 may correspond to the sensor 14 sensing the last device 12 of the group of devices 12 reaching the designated state, e.g., sensing that all devices of the group of devices 12 have reached the designated state.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for capturing automation data comprising:
   executing a scan cycle using a controller configured as an automation controller;
   collecting input data during the scan cycle from at least one sensor in communication with the controller;
   wherein:
      the at least one sensor corresponds to at least one member;
      the at least one member is defined by a plurality of elements;
      each respective element of the plurality of elements has a respective element value determined by the input data;
      determining each respective element value for the scan cycle using the input data collected during the scan cycle;
   configuring a multi-array using the controller, wherein:
      the multi-array includes the at least one member and the plurality of elements defined by the at least one member;
      configuring the multi-array includes:
         allocating a multi-array memory location to store the multi-array in the controller;
         the multi-array memory location including a respective controller memory location for each respective element of the plurality of elements defined by the at least one member;

storing the element value of each respective element for the scan cycle in the respective controller memory location in the multi-array;

the scan cycle is defined by a sequence of operations monitored by the controller;

wherein:
   the at least one member corresponds to an operation of the sequence of operations;
   the plurality of elements defined by the at least one member includes a first element and a second element of the operation;
   the first element has a first element value corresponding to a start time of the operation, wherein the start time is detected by the controller using the input data;
   the second element has a second element value corresponding to an end time of the operation, wherein the end time is detected by the controller using the input data;
time stamping, using the controller, the start time of the operation such that the first element value is a first time stamp generated by the controller at the start time of the one operation; and
time stamping, using the controller, the end time of the operation such that the second element value is a second time stamp generated by the controller at the end time of the operation.

2. The method of claim 1, further comprising:
executing the scan cycle a plurality of times using the controller, to provide a plurality of scan cycles including a current scan cycle and a prior scan cycle;
wherein the prior scan cycle precedes the current scan cycle;
determining the respective element value of each respective element for each respective scan cycle of the plurality of scan cycles using the input data collected during the respective scan cycle;
for each respective element of the plurality of elements, comparing a current element value of the respective element determined from the current scan cycle to a prior element value of the respective element determined from the prior scan cycle to determine whether the current element value is changed from the prior element value; and
storing the current element value of each respective element for the scan cycle in the respective controller memory location for the respective element when the current element value is changed from the prior element value.

3. The method of claim 1, wherein:
the at least one sensor includes a plurality of sensors;
collecting input data during the scan cycle includes collecting input data from the plurality of sensors;
wherein the at least one member corresponds to the plurality of sensors; and
determining each respective element value for the at least one value for the scan cycle including using input data collected from the plurality of sensors during the respective scan cycle.

4. The method of claim 1, wherein:
the at least one sensor is a sensor configured to provide input data including a first input and an at least second input different from the first input;
the at least one member includes:
   a first member corresponding to the sensor and defined by a first plurality of elements each having a respective element value determined by the first input; and
   an at least second member corresponding to the sensor and defined by an at least second plurality of elements each having a respective element value determined by the at least second input;
the multi-array includes the first member, the at least second member, the first plurality of elements, and at least second plurality of elements;
the multi-array memory location includes a respective controller memory location for each respective element of the first and at least second plurality of elements; and
the method further comprising:
   storing the respective element value of each respective element of the first and at least second plurality of elements for the scan cycle in the respective controller memory location of each respective element of the first and at least second plurality of elements in the multi-array.

5. The method of claim 1, wherein:
the at least one member is defined by the at least one sensor in communication with a device; and
each of the plurality of elements is determined by a state of the device.

6. The method of claim 1, wherein:
the at least one member is defined by a group of devices;
the at least one sensor is in communication with the group of devices; and
the first element is determined by a first state of the group of devices and the second element is determined by a second state of the group of devices.

7. The method of claim 1, further comprising:
executing a plurality of scan cycles using the controller;
wherein executing the plurality of scan cycles includes executing a repeating set of scan cycles;
wherein:
   the at least one member includes a set of members;
   the multi-array includes the set of members;
   each respective member of the set of members is associated with a respective scan cycle of the repeating set of scan cycles; and
determining each respective element value for the each respective member of the set of members includes using input data collected during the respective scan cycle of the repeating set of scan cycles.

8. The method of claim 1, the method further comprising:
executing a plurality of scan cycles using the controller;
wherein:
   the multi-array includes a first data matrix and at least a second data matrix;
   the at least one member includes an at least one first matrix member and an at least one second matrix member;
   the first data matrix includes the at least one first matrix member and the plurality of elements defined by the at least one first matrix member;
   the second data matrix includes the at least one second matrix member and the plurality of elements defined by the at least one second matrix member;
   the multi-array memory location is configured to include a respective controller memory location for each respective element of the plurality of elements defined by the at least one first matrix member and the at least one second matrix member;
defining a collection frequency for the first data matrix and the at least second data matrix; and
storing the element value of each respective element for the plurality of scan cycles in the respective controller memory location in the first data matrix and the at least second data matrix according to the collection frequency.

9. The method of claim 8, wherein the at least one first matrix member and the at least one second matrix member are configured as the same member.

10. The method of claim 8, wherein:
the scan cycle is characterized by a scan rate; and
the collection frequency is defined relative to the scan rate.

11. The method of claim 1, further comprising:
providing a computing device in communication with the controller;
configuring a first data table using the computing device;
wherein configuring the first data table includes storing the respective controller memory location for each respective element of the plurality of elements in the computing device such that each of the controller memory locations for each respective element is associated with a corresponding location in the first data table to provide a plurality of corresponding locations;
executing a data capture cycle using the computing device;
reading the multi-array memory location of the controller during the data capture cycle using the computing device; and
writing each respective element value read from the multi-array memory location of the controller into the corresponding location of the first data table.

12. The method of claim 11, wherein:
the scan cycle is characterized by a scan rate; and
the capture cycle is characterized by a capture rate of longer duration than the scan rate.

13. The method of claim 11, wherein reading the multi-array memory location of the controller includes reading each respective controller memory location of the multi-array memory location.

14. The method of claim 13, further comprising:
executing the data capture cycle a plurality of times using the computing device to provide a plurality of data capture cycles including a current data capture cycle and a prior data capture cycle;
wherein the prior data capture cycle precedes the current data capture cycle; for each respective controller memory location in the multi-array,
comparing a current element value read from each respective controller memory location during the current data capture cycle to a prior element value stored in a respective corresponding location in the first data table to determine whether the current element value is changed from the prior element value; and
storing the current element value of each respective element read from the respective controller memory location in the respective corresponding location of the first data table when the current element value is changed from the prior element value.

15. The method of claim 11, further comprising:
configuring a second data table using the computing device; wherein the second data table is configured to convert the respective element values of the plurality of elements written into the plurality of corresponding locations of the first data table into the second table such that the at least one member is associated with the respective element values of the plurality of elements defined by the at least one member;
wherein executing the data capture cycle using the computing device further includes converting the element values written into the first data table into the second data table;
storing the second data table in a database using the computing device;
wherein the respective element values of the plurality of elements defined by the at least one member are associated with the at least one member in the database.

16. The method of claim 15, further comprising:
executing the data capture cycle a plurality of times using the computing device, to provide a plurality of data capture cycles; and
wherein storing the second data table in a database using the computing device includes storing the respective element values of the plurality of elements from the plurality of data capture cycles such that the respective element values associated with the at least one member from one of the plurality of data capture cycles can be compared with the respective element values associated with the at least one member from another of the plurality of data capture cycles.

17. The method of claim 1, wherein:
a cycle time for the member is defined by the start time and the end time;
the method further comprising:
determining a first cycle time for the at least one member using the computing device;
wherein the first cycle time is defined by the respective first and second element values associated with the at least one member from one of the plurality of data capture cycles.

18. The method of claim 17, the method further comprising:
determining a second cycle time for the at least one member using the computing device;
wherein the second cycle time is defined by the respective first and second element values associated with the at least one member from another of the plurality of data capture cycles; and
comparing the first cycle time and the second cycle time using the computing device.

19. A system comprising:
a controller configured as an automation controller;
a plurality of sensors in communication with the controller;
a computing device in communication with the controller;
wherein the controller is programmed to:
execute a scan cycle at a scan frequency;
wherein the scan cycle is defined by a sequence of operations monitored by the controller;
collect input data during the scan cycle from the plurality of sensors;
wherein at least one operation of the sequence of operations corresponds to at least one sensor of the plurality of sensors;
configure a multi-array including at least one member and a first element and a second element defined by the at least one member;
wherein:
the at least one member corresponds to the at least one operation;
the first element has a first element value corresponding to a start time of the at least one operation, wherein the start time is detected by the controller using the input data;

the second element has a second element value corresponding to an end time of the at least one operation, wherein the end time is detected by the controller using the input data;
time stamp the start time of the at least one operation such that the first element value is a first time stamp generated by the controller at the start time of the at least one operation;
time stamp the end time of the at least one operation such that the second element value is a second time stamp generated by the controller at the end time of the at least one operation;
wherein configuring the multi-array includes:
allocating a multi-array memory location in the controller; the multi-array memory location including a respective controller memory location for each of the first element and the second element defined by the at least one member;
determine the first and second element values during the scan cycle using the controller;
store the element value of each respective element defined by the at least one member for the scan cycle in the respective controller memory location in the multi-array;
wherein the computing device is programmed to:
configure a first data table using the computing device;
wherein configuring the first data table includes storing the respective controller memory location for each respective element in the computing device such that each of the controller memory locations for each respective element is associated with a corresponding location in the first data table to provide a plurality of corresponding locations;
execute a data capture cycle at a data capture frequency;
read the multi-array memory location of the controller during the data capture cycle; and
write each respective element value read from the multi-array memory location of the controller into the corresponding location of the first data table.

20. The system of claim 19, wherein the first and second element is stored in the multi-array as a value-time stamp pair.

21. The system of claim 19, further comprising:
the at least one sensor in communication with at least two devices;

wherein:
a respective device of the at least two devices performs each respective operation of at least two concurrent operations of the sequence of operations;
the at least one member includes at least two members corresponding to the at least two devices;
each respective member of the at least two members defines a first element and a second element;
the first element of the at least two members has a first element value corresponding to a start time of the at least two concurrent operations, wherein the start time is detected by the controller using the input data and is the same start time for each of the at least two members;
the second element of each respective member of the at least two members has a second element value which is detected by the controller using the input data and corresponds to a respective end time of the respective one of the at least two concurrent operations performed by the respective member.

22. The system of claim 19, further comprising:
the computing device including a database, the computing device further programmed to:
configure a second data table;
wherein the second data table is configured to convert the plurality of corresponding locations of the first data table into the second table such that the at least one member is associated with the first and second elements defined by the at least one member;
execute the data capture cycle including converting the element values written into the first data table into the second data table; and
store the second data table in the database;
wherein the respective element values of the plurality of elements defined by the at least one member are associated with the at least one member in the database.

23. The system of claim 19, further comprising:
the computing device programmed to determine a cycle time for the at least one operation corresponding to the at least one member;
wherein the cycle time is defined by the first and second element values associated with the at least one member in the database.

* * * * *